US008755354B2

(12) United States Patent
Patel et al.

(10) Patent No.: US 8,755,354 B2
(45) Date of Patent: *Jun. 17, 2014

(54) METHODS AND APPARATUS FOR BROADCAST OPTIMIZATION IN MOBILE IP

(75) Inventors: Alpesh Patel, Santa Clara, CA (US); Kent K Leung, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,094

(22) Filed: Jul. 13, 2012

(65) Prior Publication Data

US 2012/0281612 A1    Nov. 8, 2012

Related U.S. Application Data

(60) Division of application No. 12/107,739, filed on Apr. 22, 2008, now Pat. No. 8,243,681, which is a continuation of application No. 10/256,061, filed on Sep. 25, 2002, now Pat. No. 7,379,433.

(51) Int. Cl.
*H04W 4/00* (2009.01)
*H04W 36/00* (2009.01)

(52) U.S. Cl.
USPC .................. 370/331; 455/432.1; 455/436

(58) Field of Classification Search
USPC ............. 370/312, 328, 338, 349; 455/435.1
See application file for complete search history.

(56) References Cited

U.S. PATENT DOCUMENTS

| 4,692,918 A | 9/1987 | Elliott et al. |
|---|---|---|
| 5,016,244 A | 5/1991 | Massey, Jr. et al. |
| 5,018,133 A | 5/1991 | Tsukakoshi et al. |
| 5,218,600 A | 6/1993 | Schenkyr et al. |
| 5,371,852 A | 12/1994 | Attanasio et al. |
| 5,473,599 A | 12/1995 | Li et al. |

(Continued)

FOREIGN PATENT DOCUMENTS

| WO | WO 2004036875 | 4/2004 |
|---|---|---|
| WO | WO 2006016766 | 2/2006 |

OTHER PUBLICATIONS

S. Glass, "Internet Draft: glass-mobileip-agent-dhep-proxy-00", Internet Engineering Task Force, Sun Microsystems, Mobile IP Working Group, Jun. 7, 2000, downloaded from http://www.alternic.org/drafts/drafts-g-h/draft-glass-mobileip-agent-dhcp-proxy-00.html, downloaded Sep. 16, 2002.

(Continued)

*Primary Examiner* — Ronald Abelson
(74) *Attorney, Agent, or Firm* — Novak Druce Connolly Bove + Quigg LLP

(57) ABSTRACT

In accordance with various embodiments, a Home Agent receives a registration request and sends a registration reply having a network mask extension including a network mask associated with the home address of the Mobile Node. Once the Mobile Node has obtained its network mask, it may send packets such as broadcast packets, as well as roam to its Home Agent. Additionally, in accordance with various embodiments, when a Home Agent receives a broadcast packet, it forwards the broadcast packet to a care-of address of the broadcast packet without duplicating the broadcast packet. Instead, the Foreign Agent obtains the subnet from the broadcast packet, identifies the Mobile Node(s) on that subnet, and duplicates the broadcast packet for transmission to the identified Mobile Node(s).

21 Claims, 6 Drawing Sheets

(56) References Cited

U.S. PATENT DOCUMENTS

| | | | |
|---|---|---|---|
| 5,572,528 | A | 11/1996 | Shuen |
| 5,619,552 | A | 4/1997 | Karppanen et al. |
| 5,729,537 | A | 3/1998 | Billström |
| 5,825,759 | A | 10/1998 | Liu |
| 5,862,345 | A | 1/1999 | Okanoue et al. |
| 6,078,575 | A | 6/2000 | Dommety et al. |
| 6,195,705 | B1 | 2/2001 | Leung |
| 6,501,746 | B1 | 12/2002 | Leung |
| 6,535,493 | B1 | 3/2003 | Lee et al. |
| 6,567,664 | B1 | 5/2003 | Bergenwall et al. |
| 6,922,404 | B1 | 7/2005 | Narayanan et al. |
| 7,036,143 | B1 | 4/2006 | Leung et al. |
| 7,079,499 | B1 | 7/2006 | Akhtar et al. |
| 7,246,373 | B1 | 7/2007 | Leung et al. |
| 7,379,433 | B1 * | 5/2008 | Patel et al. .................. 370/312 |
| 8,243,681 | B2 * | 8/2012 | Patel et al. .................. 370/331 |
| 2002/0009066 | A1 | 1/2002 | Shimizu et al. |
| 2002/0031097 | A1 * | 3/2002 | Jung ............................ 370/270 |
| 2003/0018715 | A1 | 1/2003 | O'Neill |
| 2003/0224758 | A1 | 12/2003 | O'Neill et al. |
| 2004/0052238 | A1 | 3/2004 | Borella et al. |
| 2004/0092260 | A1 | 5/2004 | Thubert et al. |
| 2005/0272438 | A1 | 12/2005 | Holur et al. |
| 2007/0291705 | A1 | 12/2007 | Iyer et al. |

OTHER PUBLICATIONS

T. Li, B. Cole, P. Morton, and D. Li, "Cisco Hot Standby Router Protocol (HSRP)," Mar. 1998, Network Working Group RFC 2281 (http://ftp.ietf.org/rfc/rfc2281.txt?number=2281).

Release notes for 3Com Corporation, "Conducting a Redundant Route for Network Resiliency", Mar. 1994, *NET Builder Family Bridge/Router*, pp. 26-29.

J. Moy, RFC 1247 "OSPF Version 2", Jul. 19, 1991.

D. Oran, RFC 1142 "OSI IS-IS Intra-domain Routing Protocol", Feb. 1990.

Uyless Black, "TCP/IP and Related Protocols", 1992, McGraw-Hill, Inc., pp. 226-249.

S. Deering, "Host Extensions for IP Multicasting," Network working Group, RFC 1112, Aug. 1989, pp. 1-16.

Chambless, et al., "Home Agent Redundancy Protocol (HARP)", Oct. 27, 1997.

C. Perkins, Networking Working Group, RFC 2002 "IP Mobility Support", Oct. 1996.

C. Perkins, "IP Mobility Support for IPv4", RFC 3220, Nokia Research Center, Jan. 2002.

Handbook of Wireless Networks and Mobile Computing, Chapter 25, Edited by Ivan Stojmenovic Copyright 2002 John Wiley & Sons, Inc.

U.S. Office Action dated Apr. 18, 2011 issued in U.S. Appl. No. 12/107,739.

U.S. Office Action dated Jun. 16, 2011 issued in U.S. Appl. No. 12/107,739.

U.S. Office Action dated Dec. 21, 2011 issued in U.S. Appl. No. 12/107,739.

U.S. Notice of Allowance dated Apr. 13, 2012 issued in U.S. Appl. No. 12/107,739.

\* cited by examiner

METHODS AND APPARATUS FOR BROADCAST OPTIMIZATION IN MOBILE IP

RELATED APPLICATIONS

This application is a divisional application and claims priority from U.S. patent application Ser. No. 12/107,739, entitled "METHODS AND APPARATUS FOR BROADCAST OPTIMIZATION IN MOBILE IP," by Patel et al, filed on Apr. 22, 2008, which is a continuation of U.S. patent application Ser. No. 10/256,061, entitled "METHODS AND APPARATUS FOR BROADCAST OPTIMIZATION IN MOBILE IP," by Patel et al, filed on Sep. 25, 2002. Each of these references is incorporated herein in its entirety and for all purposes.

BACKGROUND OF THE INVENTION

1. Field of the Invention

The present invention relates to Mobile IP network technology. More particularly, the present invention relates to optimizing broadcast traffic in Mobile IP networks.

2. Description of the Related Art

Mobile IP is a protocol that allows laptop computers and other mobile computer units ("mobile nodes") to roam between various sub-networks while maintaining Internet and/or WAN connectivity. Without Mobile IP or similar protocols a mobile node would be unable to stay connected while roaming from one location serviced by one sub-network to another location being serviced by a different sub-network. This is because each IP address has a field that specifies the particular sub-network on which the node resides. If a user desires to take a computer that is normally attached to one node and roam so that it passes through different sub-networks, the roaming computer cannot use its home base IP address. As a result, a businessperson traveling across the country cannot travel with his or her computer across geographically disparate network segments or wireless nodes while maintaining Internet connectivity. This is not acceptable in the age of portable computational devices.

To address this problem, the Mobile IP protocol has been developed and implemented. An implementation of Mobile IP is described in RFC 3220, "IP Mobility Support for IPv4" of the Network Working Group, C. Perkins, Ed., January 2002. Mobile IP is also described in the text "Mobile IP, The Internet Unplugged" by J. Solomon, Prentice Hall, 1998. Both of these references are incorporated herein by reference in their entireties and for all purposes.

The Mobile IP process and environment are illustrated in FIG. 1. A Mobile IP environment 100 includes the Internet (or a WAN) 105 over which a mobile node 110 can communicate via mediation by a home agent 115 or a foreign agent 120. Typically, the home agent 115 and foreign agent 120 are routers or other network connection devices performing appropriate Mobile IP functions as implemented by software, hardware, and/or firmware. Note the overall network topology is arbitrary, and elements such as the home agent 115 need not directly connect to the Internet 105. For example, the home agent 115 may be connected through another router R2 125. Router R2 125 may, in turn, connect one or more other routers R3 130 with the Internet 105.

When mobile node 110 is plugged into its home network segment 135 it connects with the Internet 105 through its designated home agent 115. When the mobile node 110 roams, it can be connected to a remote network segment 140 and communicate through the available foreign agent 120. Other nodes, such as a PC 145, on remote network segment 140 also communicate with the Internet 105 through foreign agent 120. Presumably, there are many foreign agents available at geographically disparate locations to allow wide spread Internet connection via the Mobile IP protocol.

Mobile node 110 may identify foreign agent 120 through various agent solicitations and agent advertisements that form part of the Mobile IP protocol. When mobile node 110 engages with remote network segment 140, it composes a registration request for the home agent 115 to bind the mobile node's 110 current location with its home location. Foreign agent 120 then relays the registration request 150 to home agent 115. During the registration process, the home agent 115 and the mobile node 110 may then negotiate the conditions of the mobile node's 110 attachment to foreign agent 120. For example, the mobile node 110 may request a registration lifetime of 5 hours, but the home agent 115 may grant only a 3 hour period. When the negotiation is successfully completed, home agent 115 updates an internal "mobility binding table" which links the mobile node's 110 current location via its care-of address (e.g., a co-located care-of address or the foreign agent's IP address) to the identity (e.g., home address) of the mobile node 110. Further, if the mobile node 110 registered via foreign agent 120, the foreign agent 120 updates an internal "visitor table" which specifies the mobile node address, home agent address, etc. The home agent's 115 association between a mobile node's home base IP address, its current care-of address, and the remaining lifetime of that association is referred to as a binding.

If mobile node 110 wanted to send a message to a correspondent node 155 from its new location, the mobile node 110 would forward a packetized output message 160 through the foreign agent 120 over the Internet 105 to the correspondent node 155 according to standard Internet protocols. However, if the correspondent node 155 wanted to send a message 165 to the mobile node 110—whether in reply to a message from the mobile node 110 or for any other reason—the correspondent node 155 addresses that message to the IP address of the mobile node 110 as if the mobile node 110 were on the home network segment 135. The packets of the message from the correspondent node 155 are forwarded over the Internet 105 to the router R2 125 and ultimately to the home agent 115.

From the home agent's 115 mobility binding table, the home agent 115 recognizes that the mobile node 110 is no longer attached to the home network segment 135. The home agent 115 then encapsulates the packets from correspondent node 155 (which are addressed to the mobile node 110 on the home network segment 135) according to the Mobile IP protocol, and forwards these encapsulated packets 170 to the appropriate care-of address for mobile node 110. If the care-of address is the IP address of the foreign agent 120 the foreign agent 120 strips the encapsulation and forwards the message to the mobile node 110 on the remote network segment 140. The packet forwarding mechanism implemented by the home agent 115 to the foreign agent 120 is often referred to as "tunneling."

RFC 3220 further specifies the mechanism for supporting broadcast packets. Specifically, when a correspondent node sends a broadcast packet, the Home Agent duplicates the broadcast packet and forwards the duplicated broadcast packets to the appropriate Foreign Agent(s) so that the broadcast packets may each be sent to the Mobile Nodes supported by the Home Agent that have roamed to that Foreign Agent. Thus, even when the Mobile Nodes to which the broadcast packets have been forwarded are stationed on the same home subnet and have roamed to the same care-of address, the Home Agent must replicate the broadcast packet for each of the Mobile Nodes to which the broadcast packet is to be forwarded.

In addition, in order to reuse address space and use private addresses, a Mobile Node may be dynamically assigned a home address by the Home Agent. A system for dynamically assigning a home address is described in application Ser. No. 09/227,397, entitled "Mobile IP Dynamic Home Address Resolution," filed on Jan. 8, 1999, which is incorporated by reference herein for all purposes. However, when a Mobile Node is dynamically assigned a home address, the Mobile Node cannot ascertain its network mask (prefix length) of the home address. Without its network mask, the Mobile Node cannot recognize the prefix length being advertised by the Home Agent as its own, and therefore the Mobile Node cannot roam home. If the Mobile Node had somehow roamed home, the Mobile Node cannot itself send Address Resolution Protocol (ARP) packets since it does not know its own subnet.

Even when a Mobile Node is statically configured with a home address, the Foreign Agent is not in possession of the network mask associated with the home address assigned to the Mobile Node. This has not typically been a problem, since the Home Agent rather than the Foreign Agent has been responsible for replicating broadcast packets according to current standards. However, according to current implementation schemes, the Foreign Agent does not have the information to enable it to participate in replicating broadcast packets.

In view of the above, it would be desirable to provide an improved method for supporting broadcast traffic in a Mobile IP environment.

SUMMARY OF THE INVENTION

The present invention provides methods and apparatus for improving the transmission of broadcast traffic in Mobile IP. This is accomplished, in part, through providing a network mask associated with an assigned home address in a registration reply from the Home Agent. Accordingly, the Mobile Node as well as the Foreign Agent may use this information to improve roaming and data transmission in a Mobile IP network.

In accordance with one aspect of the invention, when a Mobile Node registers via a Foreign Agent supporting Mobile IP, the Foreign Agent receives a registration request from a Mobile Node and sends the registration request to a Home Agent. A registration reply received from the Home Agent has a network mask extension including a network mask associated with the home address of the Mobile Node. The Foreign Agent then sends the registration reply to the Mobile Node. Alternatively, the Mobile Node may register via a collocated care-of address without assistance by a Foreign Agent, in which case the registration reply is received directly from the Home Agent (as the specified care-of address).

In accordance with another aspect of the invention, either the Mobile Node or the Foreign Agent appends a network mask extension to the registration request indicating that the Mobile Node and/or Foreign Agent can process a registration reply having a network mask extension including a network mask. For instance, the Mobile Node may append the extension to the registration request when it registers via a collocated care-of address or in response to an agent advertisement from the Foreign Agent indicating the ability of the Foreign Agent to process such a registration reply. Alternatively, the Foreign Agent may append the network mask extension to the registration request prior to its transmission to the Home Agent. For instance, a Mobile Node that is not configured with a Network Address Identifier (NAI) (e.g., a Mobile Node being statically configured with an IP address), as will be described in further detail below with reference to RFC 2486, is aware of its network mask, but the Foreign Agent is not. Thus, in this instance, the Foreign Agent may append the network mask extension in order to request the network mask from the Home Agent (as well as inform the Home Agent that the Foreign Agent supports broadcast optimization).

In accordance with another aspect of the invention, the Foreign Agent obtains the network mask from the network mask extension of the registration reply prior to forwarding the registration reply to the Mobile Node. The Foreign Agent then stores the network mask in its visitor table. In this manner, the Foreign Agent may duplicate broadcast packets as appropriate using the network mask information from its visitor table.

In accordance with another aspect of the invention, the Home Agent receives a registration request identifying the Mobile Node and a care-of address of the Mobile Node. The Home Agent updates a mobility binding table with the care-of address of the Mobile Node. The Home Agent then composes a registration reply, the registration reply having a network mask extension including a network mask associated with the home address of the Mobile Node. The Home Agent then sends the registration reply to the care-of address of the Mobile Node. The Home Agent may then forward broadcast packets to the care-of address over an established tunnel.

In accordance with yet another aspect of the invention, once the Mobile Node has obtained its network mask, it may send packets such as ARP packets. In addition, since the Mobile Node can now recognize the prefix length being advertised by the Home Agent as its own, the Mobile Node may roam home to its Home Agent.

In accordance with another aspect of the invention, the Foreign Agent duplicates broadcast packets for transmission to Mobile Nodes, rather than receiving the duplicated packets from the Home Agent. In this manner, broadcast traffic in a Mobile IP environment is optimized.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein. For example, registration request and reply packets having the format described herein and provided on appropriate media are part of this invention.

These and other features of the present invention will be described in more detail below in the detailed description of the invention and in conjunction with the following figures.

DETAILED DESCRIPTION OF THE PREFERRED EMBODIMENTS

In the following description, numerous specific details are set forth to provide a thorough understanding of the present invention. It will be obvious, however, to one skilled in the art that the present invention may be practiced without some or all of these specific details. In other instances, well known process steps have not been described in detail in order to avoid unnecessarily obscuring the present invention.

One standardized method for identifying users is proposed in RFC 2486 of the Network Working Group, January 1999, hereby incorporated by reference, which proposes syntax for the NAI, the userID submitted by a client during Point to Point Protocol (PPP) authentication. For instance, the mobile node may be configured with a NAI such as mnl@cisco.com. Thus, when a client is authenticated based upon the NAI, an IP address (i.e., Home Address) may be allocated for use by the client.

The present invention enables a Mobile Node having a dynamically assigned home address to ascertain its network mask. Through identification of the network mask associated with its home address, it may further ascertain its home subnet. In this manner, the present invention enables a Mobile Node to transmit packets as well as roam home.

The Internet Draft "Mobile IP Agents as DHCP Proxies" by S. Glass, Jun. 7, 2000 discloses a mechanism for sending prefix length information to the Mobile Node. Specifically, when a Mobile Node using DHCP registers with a Home Agent and requests a home address assignment, the Home Agent assigns an address using DHCP. Once the Home Agent assigns a home address using DHCP, a prefix length associated with the assigned home address is transmitted with the registration reply. However, this prior art mechanism for transmitting the prefix length to the Mobile Node is only performed for clients using DHCP. In accordance with the present invention, prefix length information is sent independent of the manner in which the Home Agent assigns a home address (and independent of the manner in which the network mask is assigned). In other words, even when the Home Agent assigns a home address from a local pool of addresses or AAA server such as a RADIUS or TACACS+ server, the prefix length information is sent to the Mobile Node.

Figure 1:
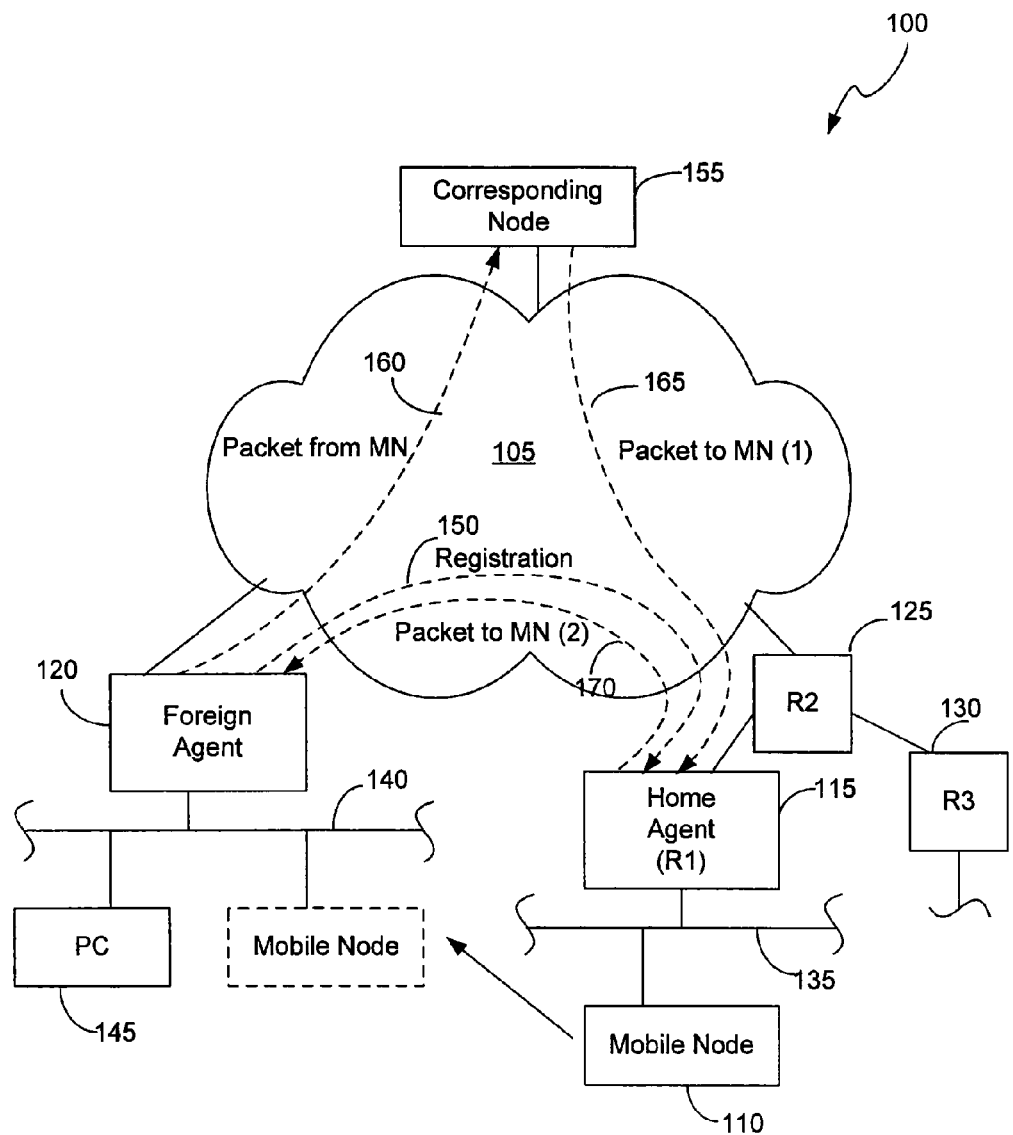
FIG. 1 is a block diagram of a Mobile IP environment.
Figure 2A:
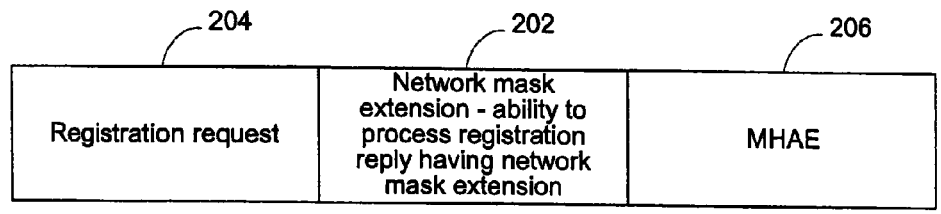
FIG. 2A is a diagram illustrating an exemplary registration request packet that is transmitted in accordance with various embodiments of the invention.

FIG. 2A is a diagram illustrating an exemplary registration request packet that is transmitted in accordance with various embodiments of the invention. The registration request may indicate that the device identified by the care-of address of the Mobile Node can understand a network mask extension transmitted with a registration reply, which will be described in further detail below with reference to FIG. 2B. This is accomplished, in accordance with various embodiments of the invention, by appending a network mask extension 202 to a registration request 204. As shown, the network mask extension 202 is appended before the Mobile-Home Authentication Extension (MHAE) 206, which is described in detail in RFC 3220. The network mask extension 202 may therefore indicate that the device identified by the care-of address can understand the network mask extension transmitted with the registration reply, as will be described in further detail below. Specifically, the presence or absence of a network mask extension 202 of the registration request 204, as well as the contents of the network mask extension 202 of the registration request 204, may indicate that the device identified by the care-of address of the Mobile Node can understand and therefore process the network mask extension of the registration reply.

It is important to note that the care-of address of the Mobile Node as specified in the registration request may correspond to a Foreign Agent care-of address as well as a collocated care-of address of a Mobile Node that is not accessing a Foreign Agent. Thus, the network mask extension 202 of the registration request 204 may indicate that the Mobile Node and/or Foreign Agent is capable of understanding and processing a network mask extension transmitted with a registration reply.

Figure 2B:
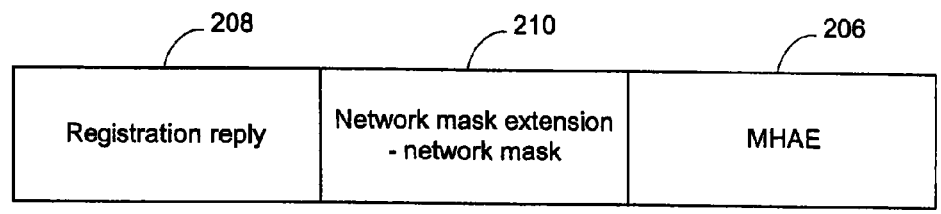
FIG. 2B is a diagram illustrating an exemplary registration reply packet that is transmitted in accordance with various embodiments of the invention.

FIG. 2B is a diagram illustrating an exemplary registration reply packet that is transmitted in accordance with various embodiments of the invention. The registration reply 208 composed and sent by the Home Agent has a network mask extension 210 including a network mask associated with the home address of the Mobile Node. The network mask may also be referred to as a prefix length, which indicates a number of bytes in the prefix of the network address that identifies the subnet. The MHAE 206 is appended to the registration reply 208 after the network mask extension 210, as shown.

Figure 2C:
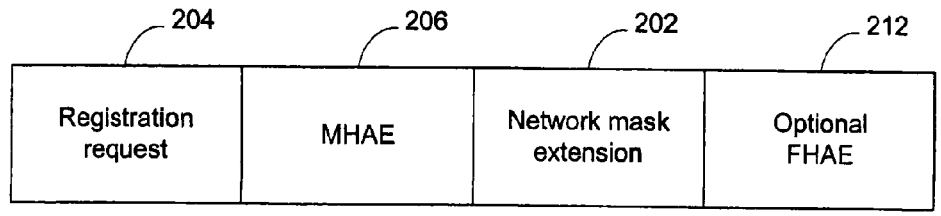
FIG. 2C is a diagram illustrating an exemplary registration request that is transmitted in accordance with various embodiments of the invention.

FIG. 2C is a diagram illustrating an exemplary registration request packet that is transmitted in accordance with various embodiments of the invention. When a Foreign Agent appends the network mask extension 202 to the registration request 204, the network mask extension 202 will preferably appended after the MHAE extension 206, as shown. In addition, a Foreign-Home authentication extension 212 may be appended, in order to enable the Home Agent to authenticate the Foreign Agent. In this manner, the Home Agent may ascertain that the Foreign Agent has the authority to receive the network mask information from the Home Agent prior to transmitting this information with the registration reply.

Figure 3:
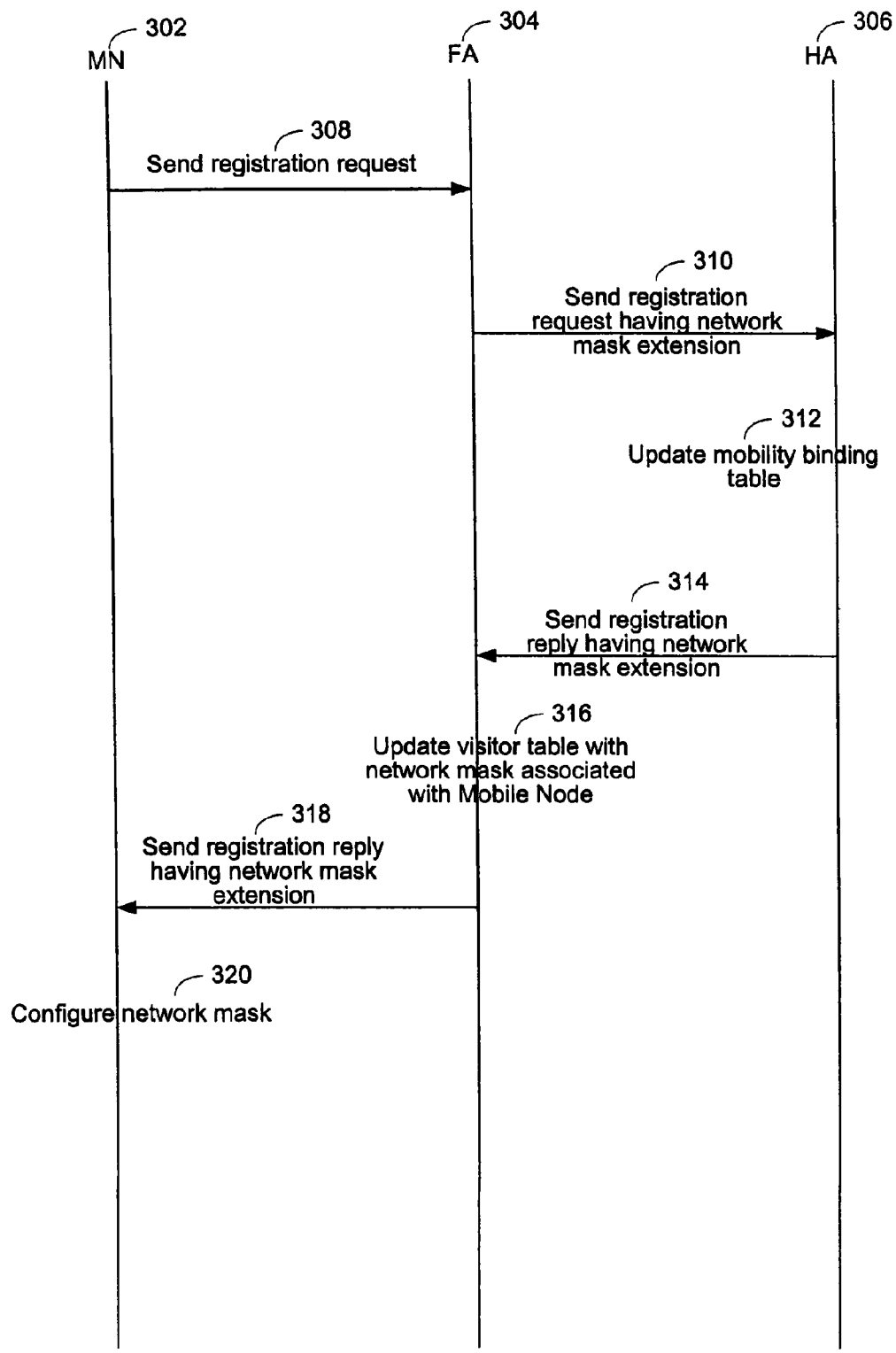
FIG. 3 is a process flow diagram illustrating a method of registering a Mobile Node in accordance with various embodiments of the invention.

FIG. 3 is a process flow diagram illustrating a method of registering a Mobile Node in accordance with various embodiments of the invention. Steps performed by the Mobile Node, Foreign Agent, and Home Agent are represented by corresponding vertical lines 302, 304, and 306, respectively. In the illustrated embodiment, the Mobile Node registers via a Foreign Agent. However, the Mobile Node may also register via a collocated care-of address.

As shown at 308 the Mobile Node sends a registration request to the Foreign Agent. The registration request may indicate that the device identified by the care-of address, the Mobile Node, and/or Foreign can understand a network mask extension transmitted with a registration reply. As described above, this may be accomplished by appending a network mask extension to the registration request. Thus, the network mask extension may be appended by the Foreign Agent to the registration request. Alternatively, the network mask extension may be appended by the Mobile Node to the registration request prior to sending the registration request to its Home Agent. For instance, the Mobile Node may append the network mask extension when the Mobile Node registers using a collocated care-of address. As another example, the Mobile Node may append the network mask extension after receiving an agent advertisement from the Foreign Agent that indicates that the Foreign Agent can understand and process a network mask extension transmitted with a registration reply.

The Foreign Agent then sends the registration request having the network mask extension at 310 to the Home Agent. The Home Agent updates its mobility binding table at 312 to identify the Mobile Node with its care-of address as specified in the registration request. The Home Agent then composes and sends a registration reply having a network mask extension including a network mask (i.e., prefix length) at 314 to the care-of address of the Mobile Node. As noted above, in this example, the care-of address identifies the Foreign Agent and therefore the registration reply is sent to the Foreign Agent. The Home Agent may obtain the network mask associated with the assigned home address from its mobility binding table or other table. In addition to storing the network mask, the Home Agent may also store information in the mobility binding table noting that the care-of address (e.g., Foreign Agent) understands the prefix length extension and can thus support broadcast optimization.

When the Foreign Agent receives the registration reply having the network mask extension, the Foreign Agent updates its visitor table with the network mask associated with the Mobile Node at 316. Specifically, the Foreign Agent obtains the network mask associated with the home address of the Mobile Node from the network mask extension of the registration reply and updates a visitor table entry in a visitor table with the obtained network mask. An exemplary visitor table will be described in further detail below with reference to FIG. 4. The Foreign Agent then sends the registration reply having the network mask extension at 318 to the Mobile Node.

When the Mobile Node receives the registration reply at 320, it obtains the network mask from the network mask extension of the registration reply and configures the network mask. Once it has obtained the network mask, the Mobile Node may determine the network (subnet) on which its home address has been assigned. Through identification of its subnet, the Mobile Node may then send broadcast packets. In addition, since the Mobile Node can now recognize its home subnet, the Mobile Node may recognize the subnet of the Home Agent as its home subnet. Accordingly, through the transmission of the network mask to the Mobile Node, the Mobile Node may roam to its Home Agent. This is particularly important for Mobile Nodes having a dynamically assigned home address, since the Mobile Node cannot be preconfigured with the subnet or network mask.

Figure 4:
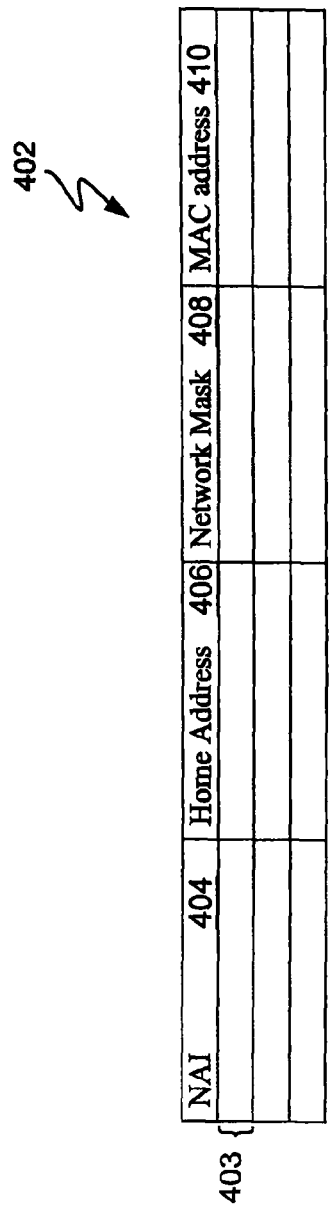
FIG. 4 is a diagram illustrating an exemplary visitor table that is maintained by a Foreign Agent in accordance with various embodiments of the invention.

FIG. 4 is a diagram illustrating an exemplary visitor table that is maintained by a Foreign Agent as described above with reference to step 316 of FIG. 3. The visitor table 402 includes a plurality of entries, each of the entries corresponding to a different Mobile Node. As described above, the Mobile Node may transmit a NAI in order to identify itself prior to receiving an assigned home address. Thus, a visitor table entry 403 may identify the NAI 404 of the Mobile Node. In addition, the visitor table entry 406 also identifies the home address 406 assigned to the Mobile Node, enabling packets to be addressed and transmitted to the Mobile Node. The visitor table entry also includes the network mask 408 associated with the home address 406. Finally, the MAC address 410 is also typically identified in the visitor table entry 403, which is typically provided in packets transmitted to the Mobile Node.

Figure 5:
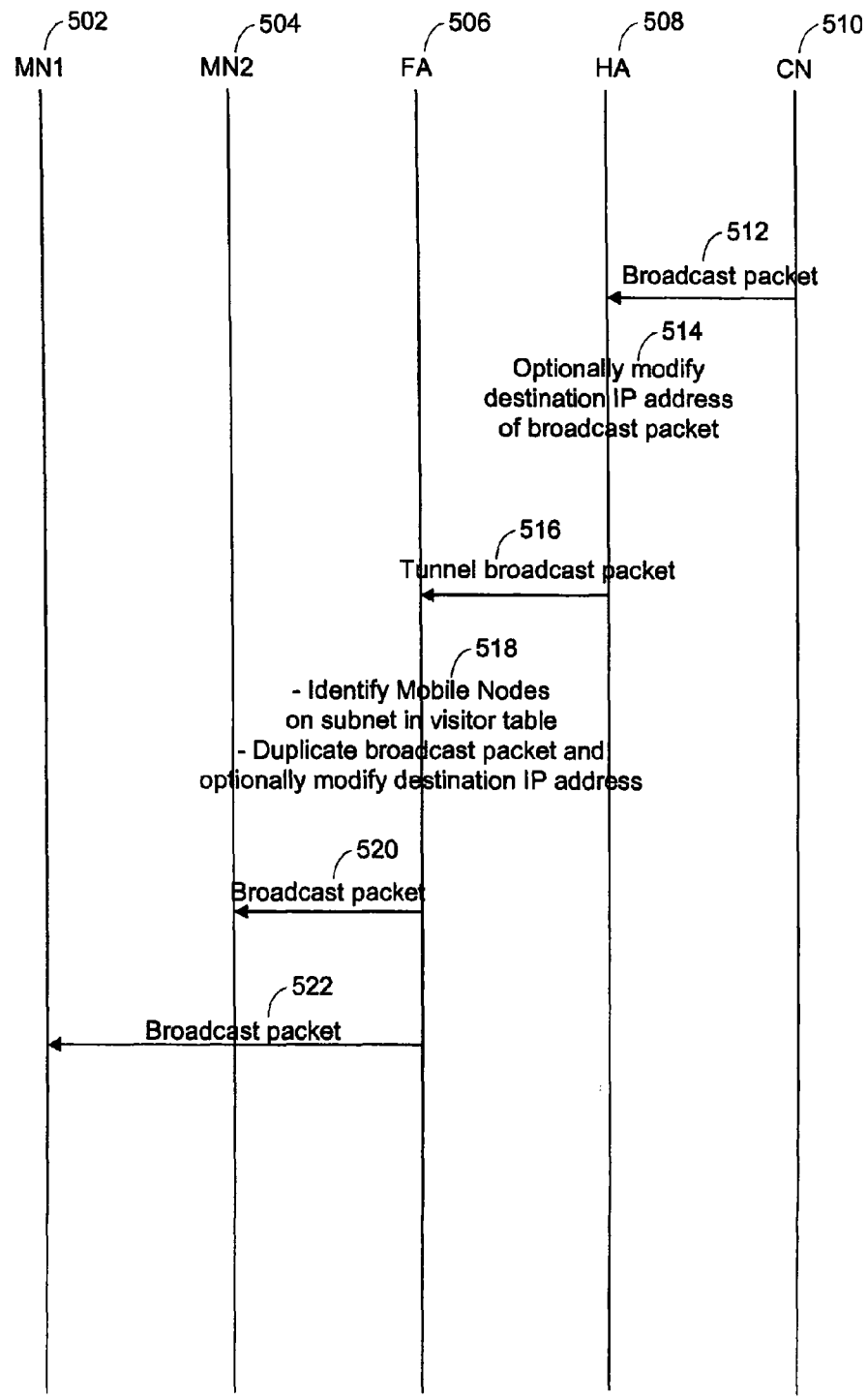
FIG. 5 is a process flow diagram illustrating a method of transmitting data packets from a correspondent node to a Mobile Node in accordance with various embodiments of the invention.

Once a Mobile Node registers in accordance with various embodiments of the invention, a broadcast data packet may be transmitted as shown in FIG. 5. FIG. 5 is a process flow diagram illustrating a method of transmitting data packets from a correspondent node to a Mobile Node in accordance with various embodiments of the invention. In this example, a broadcast packet is sent and received by two different Mobile Nodes, MN1 and MN2. Steps performed by the MN1, MN2, Foreign Agent, Home Agent, and correspondent node are represented by corresponding vertical lines 502, 504, 506, 508, and 510, respectively.

As shown at 512 a correspondent node sends a broadcast data packet at 512 to the Home Agent. When the Home Agent receives the broadcast data packet, it optionally modifies the destination IP address of the broadcast data packet at 514 prior to forwarding the broadcast data packet at 516 via the appropriate tunnel, as will be described in further detail below with reference to steps 512-514. It is important to note that the broadcast data packet is forwarded via the care-of address without duplicating the broadcast data packet at the Home Agent. Thus, the present invention enables the optimization of broadcast transmission in Mobile IP, since a single packet is transmitted by the Home Agent to the Foreign Agent (or to the Mobile Node in the case of a collocated care-of address). An extra encapsulation step is also avoided in the case of the collocated care-of address.

The destination IP address of the broadcast data packet initially transmitted by the correspondent node at 512 may be either a link local broadcast address or a subnet-directed broadcast address, which are defined in RFC 1812, which is incorporated herein by reference for all purposes. The Home Agent preferably transmits a subnet-directed broadcast packet to the care-of address (e.g., Foreign Agent) via the tunnel. Once the Foreign Agent receives the subnet-directed broadcast packet, the Foreign Agent may look up the subnet prefix in its visitor table to ascertain those Mobile Nodes that are visiting on that subnet. From this information, the Foreign Agent can determine which Mobile Nodes should receive the subnet-directed broadcast packet. Thus, if the destination IP address of the broadcast data packet received at 512 is not a subnet-directed broadcast packet (i.e., the destination IP address is a link local broadcast address), the Home Agent modifies the destination IP address of the broadcast data packet to a subnet-directed broadcast address at 514 prior to forwarding the broadcast data packet at 516.

When the Foreign Agent receives the broadcast data packet from the Home Agent, the Foreign Agent obtains the subnet from the broadcast data packet, identifies the Mobile Node(s) (e.g., two or more Mobile Nodes) on the obtained subnet from the visitor table, and duplicates the broadcast data packet as necessary at 518. In addition, the Foreign Agent optionally modifies the destination IP address of the duplicated broadcast data packets prior to transmission to the appropriate Mobile Node(s). In order to identify the Mobile Node(s) on the specified subnet, the Foreign Agent obtains the network mask as well as the home address from a visitor table entry. The subnet for the Mobile Node may then be identified from the obtained network mask and the home address. In this manner, the Foreign Agent may determine whether the subnet of the Mobile Node is identical to the subnet of the broadcast data packet. This may be repeated by the Foreign Agent for all of the entries in the visitor table, thereby enabling all Mobile Nodes located on the specified subnet and having roamed to the Foreign Agent to be identified.

As described above, the modification of the destination IP address of the broadcast data packet by the Foreign Agent is optional. Specifically, the Foreign Agent may modify the destination IP address of the broadcast data packet from a subnet directed broadcast address to a link local broadcast address or a unicast address. Alternatively, the Foreign Agent may transmit a subnet directed broadcast data packet to the Mobile Node(s) without modifying the destination IP address.

The duplicated broadcast data packets are then transmitted by the Foreign Agent to the Mobile Nodes, as shown. More specifically, the first broadcast data packet is sent at 520 to the MN2. The second broadcast data packet is sent at 522 to the MN1. In this manner, duplication of broadcast data packets is performed by the Foreign Agent rather than the Home Agent, thereby eliminating the consumption of bandwidth over the greatest distance, that between the Home Agent and the Foreign Agent. Accordingly, the responsibility of duplication and transmission of duplicated packets is transferred from the Home Agent to the Foreign Agent, enabling bandwidth consumption to be transferred to the shortest distance, that between the Foreign Agent and the Mobile Nodes it supports.

It is important to note that in this example, duplication of the broadcast data packet is necessary in order to transmit the broadcast data packet to the two different Mobile Nodes, MN1 and MN2. However, duplication is not necessary where the broadcast data packet is to be sent to a single Mobile Node by the Foreign Agent.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, home agents, and foreign agents of this invention may be implemented in specially configured routers, switches or servers, such as specially configured router models 2600, 3200, 3600, 4500, 7200, and 7500 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 6:
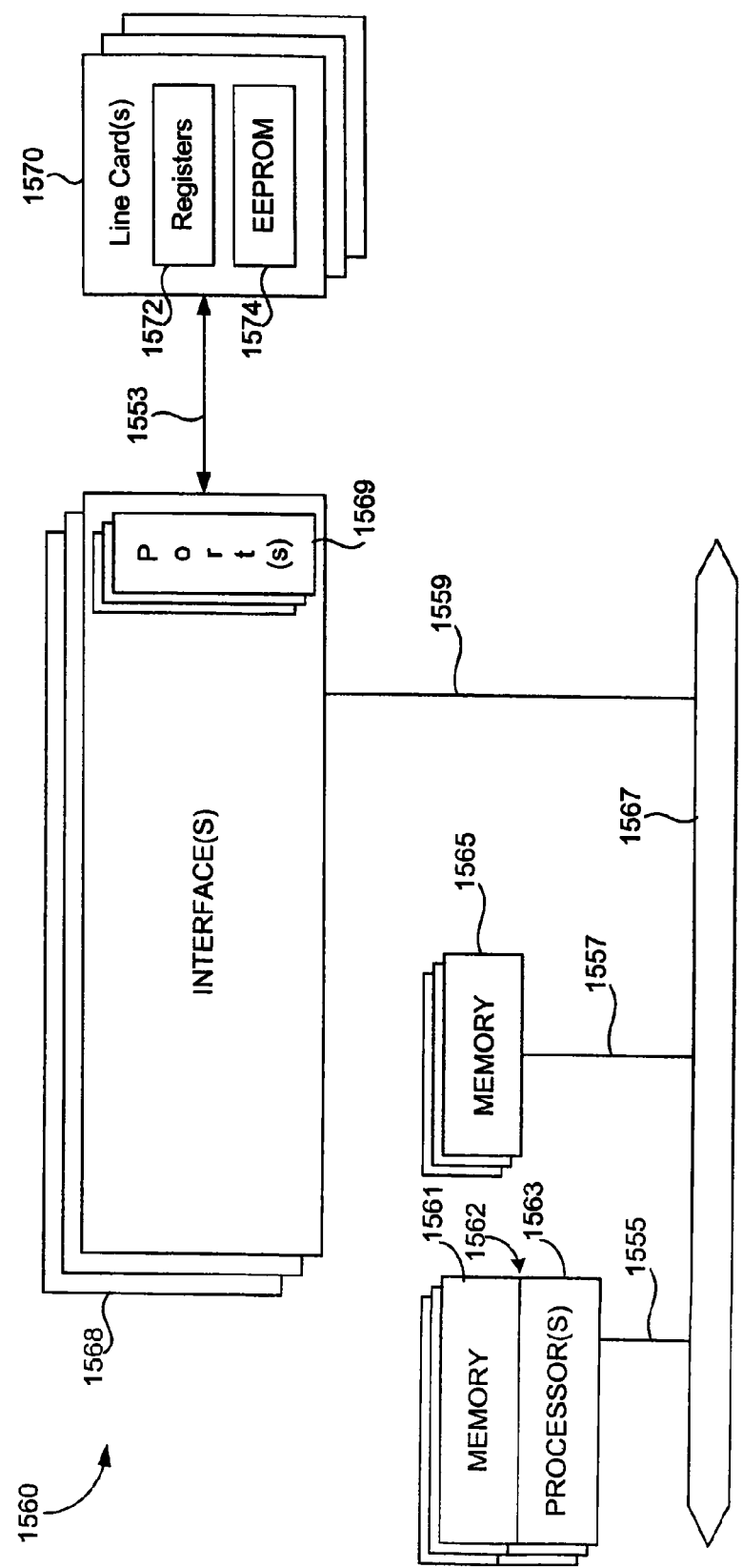
FIG. 6 is a diagram illustrating an exemplary network device in which various embodiments of the invention may be implemented.

Referring now to FIG. 6, a network device 1500 suitable for implementing the techniques of the present invention includes a master central processing unit (CPU) 1505, interfaces 1510, memory 1515 and a bus 1520. When acting under the control of appropriate software or firmware, the CPU 1505 may be responsible for implementing specific functions associated with the functions of a desired network device. For example, when configured as an intermediate router, the CPU 1505 may be responsible for analyzing packets, encapsulating packets, and forwarding packets for transmission to a set-top box. The CPU 1505 preferably accomplishes all these functions under the control of software including an operating system (e.g. Windows NT), and any appropriate applications software.

CPU 1505 may include one or more processors such as those from the Motorola family of microprocessors or the MIPS family of microprocessors. In an alternative embodiment, the processor is specially designed hardware for controlling the operations of network device 1500.

The interfaces 1510 are typically provided as interface cards (sometimes referred to as "line cards"). Generally, they control the sending and receiving of data packets over the network and sometimes support other peripherals used with the network device 1500. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the CPU 1505 to efficiently perform routing computations, network diagnostics, security functions, etc.

Although the system shown in FIG. 6 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, the memory 1515) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being configured to comply with Mobile IP standards in force as of the time this document was written. However, it should be understood that the invention is not limited to such implementations. Accordingly, the present embodiments are to be considered as illustrative and not restrictive, and the invention is not to be limited to the details given herein, but may be modified within the scope and equivalents of the appended claims.

What is claimed is:

1. A Foreign Agent supporting Mobile IP, comprising:
a computing device processor; and
a memory device including instructions that, when executed by the computing device processor, enable the computing device processor to:
update a mobility binding table on the Foreign Agent, the mobility binding table comprises a subnet of a Home Agent address for two or more Mobile Nodes that indicates a Home Network of the Mobile Nodes, the Home Network being associated with a Home Agent;
receive a broadcast data packet at the Foreign Agent addressed to the Mobile Nodes from the Home Agent;
identify the two or more Mobile Nodes from the mobility binding table;
duplicate the broadcast data packet by the Foreign Agent; and
transmit each duplicated broadcast data packet to each Mobile Node.

2. The Foreign Agent as recited in claim 1, at least one of the processor or the memory being adapted for performing steps, further comprising:
obtaining a network mask associated with the Mobile Node from the packet, the network mask enabling the subnet of the Mobile Node to be determined.

3. In a Foreign Agent supporting Mobile IP, a method, comprising:
updating a mobility binding table on the Foreign Agent, the mobility binding table comprises a subnet of a Home Agent address for two or more Mobile Nodes that indicates a Home Network of the Mobile Nodes, the Home Network being associated with a Home Agent;
receiving by the Foreign Agent a broadcast data packet addressed to the Mobile Nodes from the Home Agent;
identifying by the Foreign Agent two or more Mobile Nodes from the mobility binding table;
duplicating by the Foreign Agent the broadcast data packet; and
transmitting each duplicated broadcast data packet to each Mobile Node.

4. The method as recited in claim 3, further comprising:
obtaining a network mask associated with the Mobile Node from the packet, the network mask enabling the subnet of the Mobile Node to be determined.

5. The method as recited in claim 4, wherein the packet comprises a registration reply.

6. The method as recited in claim 4, wherein the packet comprises a network mask extension including the network mask associated with the Mobile Node;
wherein obtaining the network mask comprises obtaining the network mask associated with the Mobile Node from the network mask extension of the packet.

7. The method as recited in claim 4, further comprising:
determining the subnet of the Mobile Node from a home address of the mobile node using the network mask.

8. The method as recited in claim 3, wherein the broadcast data packet is a subnet directed broadcast data packet.

9. The method as recited in claim 8, wherein duplicating the broadcast data packet and transmitting each duplicated broadcast data packet to each Mobile Node comprises:
modifying a destination IP address of the broadcast data packet from a subnet directed broadcast address to a link local broadcast address or a unicast address.

10. The method as recited in claim 8, wherein duplicating the broadcast data packet and transmitting each duplicated broadcast data packet to each Mobile Node comprises:
transmitting the subnet directed broadcast data packet to the two or more Mobile Nodes.

11. The method as recited in claim 3, wherein identifying two or more Mobile Nodes from the mobility binding table comprises:
obtaining a network mask from one of a plurality of entries in the visitor table;
obtaining a home address from the one of the plurality of entries in the visitor table;
identifying a subnet from the network mask and the home address; and determining whether the subnet is identical to the obtained subnet.

12. The method as recited in claim 4, wherein the information indicating the subnet of the Mobile node comprises the network mask.

13. The method as recited in claim 3, wherein the destination IP address of the received broadcast data packet is a link local broadcast address, the method further comprising:
modifying the destination IP address to a subnet-directed broadcast address prior to forwarding the broadcast data packet via the care-of address.

14. In a Home Agent supporting Mobile IP, a method of processing a registration request, comprising:
receiving a registration request, the registration request identifying a Mobile Node and a care-of address of the Mobile Node;
updating a mobility binding table with the care-of address of the Mobile Node;
composing and sending a registration reply to the care-of address of the Mobile Node;
receiving a broadcast data packet; and
forwarding the broadcast data packet via the care-of address without duplicating the broadcast data packet.

15. The method as recited in claim 14, wherein forwarding the broadcast data packet via the care-of address is performed without encapsulating the broadcast data packet when the care-of address is a collocated care-of address.

16. The method as recited in claim 14, wherein the destination IP address of the broadcast data packet is a link local broadcast address or a subnet-directed broadcast address.

17. A Home Agent supporting Mobile IP and adapted for processing a registration request, comprising:
a processor; and
a memory, at least one of the processor or the memory being adapted for:
receiving a registration request, the registration request identifying a Mobile Node and a care-of address of the Mobile Node;
updating a mobility binding table with the care-of address of the Mobile Node;
composing and sending a registration reply to the care-of address of the Mobile Node; receiving a broadcast data packet; and
forwarding the broadcast data packet via the care-of address without duplicating the broadcast data packet.

18. The Home Agent as recited in claim 17, wherein forwarding the broadcast data packet via the care-of address is performed without encapsulating the broadcast data packet when the care-of address is a collocated care-of address.

19. The Home Agent as recited in claim 17, wherein the destination IP address of the broadcast data packet is a link local broadcast address or a subnet-directed broadcast address.

20. The Home Agent as recited in claim 17, the registration reply having a network mask extension including a network mask associated with the home address of the Mobile Node.

21. A Foreign Agent supporting Mobile IP, comprising:
means for updating a mobility binding table on the Foreign Agent, the mobility binding table comprises a subnet of a Home Agent address for two or more Mobile Nodes that indicates a Home Network of the Mobile Nodes, the Home Network being associated with a Home Agent;
means for receiving a broadcast data packet at the Foreign Agent addressed to the Mobile Nodes from the Home Agent;
means for identifying the two or more Mobile Nodes from the mobility binding table;
means for duplicating the broadcast data packet by the Foreign Agent; and
means for transmitting each duplicated broadcast data packet to each Mobile Node.

\* \* \* \* \*